United States Patent
Hung

(10) Patent No.: US 10,702,356 B2
(45) Date of Patent: Jul. 7, 2020

(54) MASTICATORY ORTHODONTIC CORRECTION DEVICE

(71) Applicant: Cheng-Hsiang Hung, New Taipei (TW)

(72) Inventor: Cheng-Hsiang Hung, New Taipei (TW)

(*) Notice: Subject to any disclaimer, the term of this patent is extended or adjusted under 35 U.S.C. 154(b) by 0 days.

(21) Appl. No.: 15/139,201

(22) Filed: Apr. 26, 2016

(65) Prior Publication Data
US 2016/0310237 A1   Oct. 27, 2016

(30) Foreign Application Priority Data

Apr. 27, 2015  (CN) ............... 2015 1 0202838
Apr. 25, 2016  (CN) ............... 2016 1 0260756

(51) Int. Cl.
*A61C 7/00*   (2006.01)
*A61C 7/08*   (2006.01)
(Continued)

(52) U.S. Cl.
CPC ............ *A61C 7/002* (2013.01); *A61C 7/08* (2013.01); *A61C 7/36* (2013.01); *A61C 9/004* (2013.01)

(58) Field of Classification Search
CPC .. A61C 7/00; A61C 7/002; A61C 7/08; A61C 7/1036; A61F 5/566
(Continued)

(56) References Cited

U.S. PATENT DOCUMENTS 2,479,780 A * 8/1949 Remensnyder .......... A61C 7/08
                                                    433/6
3,299,512 A    1/1967 Brigante
(Continued)

FOREIGN PATENT DOCUMENTS

CN  101214171 A   7/2008
CN  104224333 A   12/2014
(Continued)

OTHER PUBLICATIONS

Korea Patent Office, Office Action, Patent Application Serial No. 10-2016-0051618, dated May 16, 2017, Korea.
(Continued)

*Primary Examiner* — Cris L. Rodriguez
*Assistant Examiner* — Matthew P Saunders

(57) ABSTRACT

A masticatory orthodontic correction device adapted to use occlusal loads generated during mastication as a correction force to achieve orthodontic correction, includes at least one correction unit with a rigid body. The correction unit is worn on a maxillary or mandibular dental arch of a patient during mastication, and the shape of the correction unit is maintained without deformation when accommodating teeth. At least one first recess is formed in the correction unit and has a shape which allows a first tooth of the maxillary or mandibular dental arch in malposition to move to the envisioned finish position. At least one buffering member is formed in the first recess configured to transmit and buffer the occlusal loads generated during mastication-between the first recess and the first tooth, wherein when the correction unit is worn during mastication, the buffering member deforms and contacts the first tooth over an area.

21 Claims, 6 Drawing Sheets

(51) Int. Cl.
*A61C 7/36* (2006.01)
*A61C 9/00* (2006.01)

(58) Field of Classification Search
USPC .......................................... 433/6, 18, 19, 24
See application file for complete search history.

(56) References Cited

U.S. PATENT DOCUMENTS

| | | | | |
|---|---|---|---|---|
| 3,950,851 A * | 4/1976 | Bergersen | A61C 7/08 | 433/6 |
| 4,330,273 A * | 5/1982 | Kesling | A61C 7/00 | 433/5 |
| 4,448,735 A * | 5/1984 | Huge | A61C 7/08 | 264/16 |
| 4,793,803 A * | 12/1988 | Martz | A61C 7/08 | 433/6 |
| 5,683,244 A * | 11/1997 | Truax | A61C 7/00 | 433/24 |
| 6,129,084 A * | 10/2000 | Bergersen | A61F 5/566 | 128/848 |
| 6,302,686 B1 * | 10/2001 | Chott | A61F 5/566 | 128/848 |
| 6,371,758 B1 | 4/2002 | Kittelsen | | |
| 6,505,625 B1 * | 1/2003 | Uenishi | A61C 7/08 | 128/848 |
| 6,572,372 B1 * | 6/2003 | Phan | A61C 7/00 | 433/18 |
| 8,033,282 B2 * | 10/2011 | Eubank | A61C 7/08 | 128/848 |
| 8,562,337 B2 * | 10/2013 | Kuo | A61C 7/08 | 433/6 |
| 9,339,410 B2 * | 5/2016 | Smith | A61F 5/566 | |
| 2003/0224312 A1 * | 12/2003 | Bergersen | A61C 7/002 | 433/6 |
| 2004/0152032 A1 * | 8/2004 | Bergersen | A61C 7/08 | 433/6 |
| 2005/0003318 A1 | 1/2005 | Choi et al. | | |
| 2007/0065768 A1 * | 3/2007 | Nadav | A61C 7/006 | 433/6 |
| 2010/0129763 A1 | 5/2010 | Kuo | | |
| 2014/0242532 A1 * | 8/2014 | Arruda | A61C 7/08 | 433/6 |
| 2014/0363779 A1 * | 12/2014 | Kopelman | A61C 7/08 | 433/6 |
| 2015/0238280 A1 * | 8/2015 | Wu | A61C 7/002 | 433/6 |

FOREIGN PATENT DOCUMENTS

| | | |
|---|---|---|
| JP | 2002-519137 | 7/2002 |
| JP | 2008-532563 | 8/2008 |
| JP | 2009-201916 | 9/2009 |
| KR | 10-1481801 | 1/2015 |
| KR | 10-1493369 | 2/2015 |
| KR | 101493369 B1 * | 2/2015 |
| TW | 200600064 A | 1/2006 |
| TW | M495833 | 2/2015 |
| TW | 201611788 A | 4/2016 |
| WO | WO 2009/017826 A1 | 2/2009 |

OTHER PUBLICATIONS

Japan Patent Office, Office Action, Patent Application Serial No. 2016-088046, dated Jul. 3, 2017, Japan.

Europe Patent Office, Search Report, Patent Application Serial No. 16167341.3, dated Aug. 30, 2016, Europe.

Europe Patent Office, Search Repoart, Patent Application Serial No. 17168017.6, dated Sep. 6, 2017, Europe.

* cited by examiner

MASTICATORY ORTHODONTIC CORRECTION DEVICE

CROSS REFERENCE TO RELATED APPLICATIONS

The present application claims priority of China Patent Application No. 201510202838.3, filed on Apr. 27, 2015, the entirety of which is incorporated by reference herein.

BACKGROUND OF THE INVENTION

Field of the Invention

The present application relates to orthodontic correction technology, and in particular to a masticatory orthodontic correction device.

Description of the Related Art

When a person's teeth are in misalignment, his dental aesthetics, functions and health may be adversely affected. Affected functions include daily activities, such as chewing, pronunciation, and breathing. Induced dental health problems include dental cavities, periodontal disease and excessive wear of teeth. The goal of orthodontic correction is to reposition or realign the teeth of a patient to positions and orientations where the dental functions are improved.

Conventional braces use an archwire as the force-inducing appliance. The archwire is pre-shaped and interconnects the teeth through brackets that are fixed to the teeth. When initially installed, the archwire elastically deforms to accommodate the teeth in malposition to exert resilient corrective forces on them. The archwire exerts continuous forces on the teeth to gradually urge them to their finish positions. Making use of the appliance's own resilient property is also the working principle with aligners. The body or shell of clear aligners used in prior art is flexible and deforms when the appliance is worn, providing resilient corrective force as it tries to return to its original shape. When a clear aligner is worn on misaligned teeth, it is elastic and tries to accommodate the misaligned teeth, but does not fully contact the surfaces of the teeth. Thus additional parts fixed to the teeth, such as attachments are needed to allow the aligner body to better engage the misaligned teeth to apply resilient force. Clear aligners are required to be worn over 20 hours per day in order to provide continuous corrective force to achieve orthodontic results.

Clear aligners have the advantage of being less visible and removable. A patient removable appliance promotes better oral hygiene as the patient can more easily clean the teeth and the appliance. However, using clear aligners with attachments fixed on misaligned teeth can be more painful for patients. It is recognized in orthodontic practice that light, intermittent forces are preferable to heavy, continuous forces in making the teeth move faster through the alveolar bone and reduce risks of root resorption.

BRIEF SUMMARY OF THE INVENTION

An embodiment of the invention provides a masticatory orthodontic correction device, including at least one correction unit with a rigid body. The correction unit is configured to be removably worn on a maxillary or mandibular dental arch of a patient during mastication, wherein when worn, the shape of the correction unit is maintained without deformation when accommodating teeth. The correction unit has an occlusal part. At least one first recess is formed in the correction unit and has a shape which leaves a first space around a first tooth of the maxillary or mandibular dental arch when the correction unit is worn. The first tooth is in malposition requiring correction and the first space allows the first tooth to move therein during mastication. At least one buffering member is formed in the first space between the first recess and the first tooth for transmitting and buffering force therebetween, wherein when the correction unit is worn during mastication, the buffering member deforms and covers the first tooth. The orthodontic correction function of the device is active under occlusal loads generated during mastication.

In some embodiments, the shape of the first recess further guides the movement of the first tooth in the first recess when the correction unit is worn during mastication.

In some embodiments, the correction unit further forms at least one second recess with a shape such that when the correction unit is worn during mastication, the second recess conforms to a second tooth of the maxillary or mandibular dental arch, causing a part of the occlusal loads to be transferred from the correction unit to the second teeth.

In some embodiments, the occlusal part has a shape for establishing functional occlusion with the other dental arch without a correction unit, wherein the worn correction unit contacts the teeth of the other dental arch with efficiency and without producing trauma during mastication.

In some embodiments, the buffering member is an elastic member.

In some embodiments, the correction unit further has a shape-memory member formed in the first recess, and when the correction unit is worn during mastication, the shape-memory member conforms to the first tooth with the shape-memory member in a deformed state and gradually applies stress on the first tooth as the shape-memory member gradually returns to its remembered shape.

In some embodiments, the correction unit is an occlusal splint.

Another embodiment of the invention also provides a masticatory orthodontic correction device, including a first correction unit with a rigid body and a second correction unit with a rigid body. The first correction unit is configured to be removably worn on the maxillary dental arch during mastication, wherein when worn, the shape of the first correction unit is maintained without deformation when accommodating teeth. The first correction unit has a first occlusal part. The second correction unit is configured to be removably worn on the mandibular dental arch during mastication, wherein when worn, the shape of the second correction unit is maintained without deformation when accommodating teeth. The second correction unit has a second occlusal part corresponding to the first occlusal part. At least one first recess is formed in the first or second correction unit and has a shape which leaves a first space around a first tooth of the maxillary or mandibular dental arch when the first and second correction units are worn. The first tooth is in malposition requiring correction, and the first space allows the first tooth to move in the first recess during mastication. At least one buffering member is formed in the first space between the first recess and the first tooth for transmitting and buffering force therebetween, wherein when the first and second correction units are worn during mastication, the buffering member deforms and covers the first tooth. The orthodontic correction function of the device is active under occlusal loads generated during mastication.

In some embodiments, the shape of the first recess further guides the movement of the first tooth in the first recess when the first and second correction units are worn during mastication.

In some embodiments, the first and second correction units further form a plurality of second recesses, each with a shape such that when the first and second correction units are worn during mastication, the second recesses conform to a plurality of second teeth of the maxillary and mandibular dental arches, causing a part of the occlusal loads to be transferred from the first or second correction unit to the second teeth.

In some embodiments, the first and second occlusal parts have shapes for establishing functional occlusion, wherein the first and second correction units contact with efficiency and without producing trauma during mastication.

In some embodiments, the buffering member is an elastic member.

In some embodiments, the first and second correction units are occlusal splints.

In some embodiments, the first and second correction units further have at least one shape-memory member formed in the first recess, and when the first and second correction units are worn during mastication, the shape-memory member conforms to the first tooth with the shape-memory member in a deformed state and gradually applies stress on the first tooth as the shape-memory member gradually returns to its remembered shape.

In some embodiments, the first occlusal part forms a plane thereon, and the second occlusal part forms a plurality of protrusions thereon for contacting the plane.

In some embodiments, when the first occlusal part contacts the second occlusal part, the plane contacts the protrusions simultaneously, and when the first occlusal part separates from the second occlusal part, the plane separates from the protrusions simultaneously.

In some embodiments, when the first occlusal part contacts the second occlusal part, the plane and the protrusions form a plurality of contact points, wherein the contact points are distributed in a curved line, and positions of the contact points respectively correspond to gullet centers of each tooth of the maxillary dental arch.

In some embodiments, the sum of the thicknesses of the first and second occlusal parts is between 1.5 mm and 2.5 mm.

In some embodiments, the first correction unit has a left buccal part, a right buccal part, and a plurality of limit parts formed on the left and right buccal parts, wherein the limit parts each have a guiding surface for guiding the second correction unit and limiting a movement range of the second correction unit relative to the first correction unit in a horizontal direction during mastication.

In some embodiments, the patient using the masticatory orthodontic correction device wears the first and second correction units on the maxillary and mandibular dental arches respectively, or one correction unit on just one of the dental arches, at the start of mastication. The patient proceeds to masticate for at least 15 minutes, whereby mastication generates the occlusal loads which activate the orthodontic correction function of the device.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
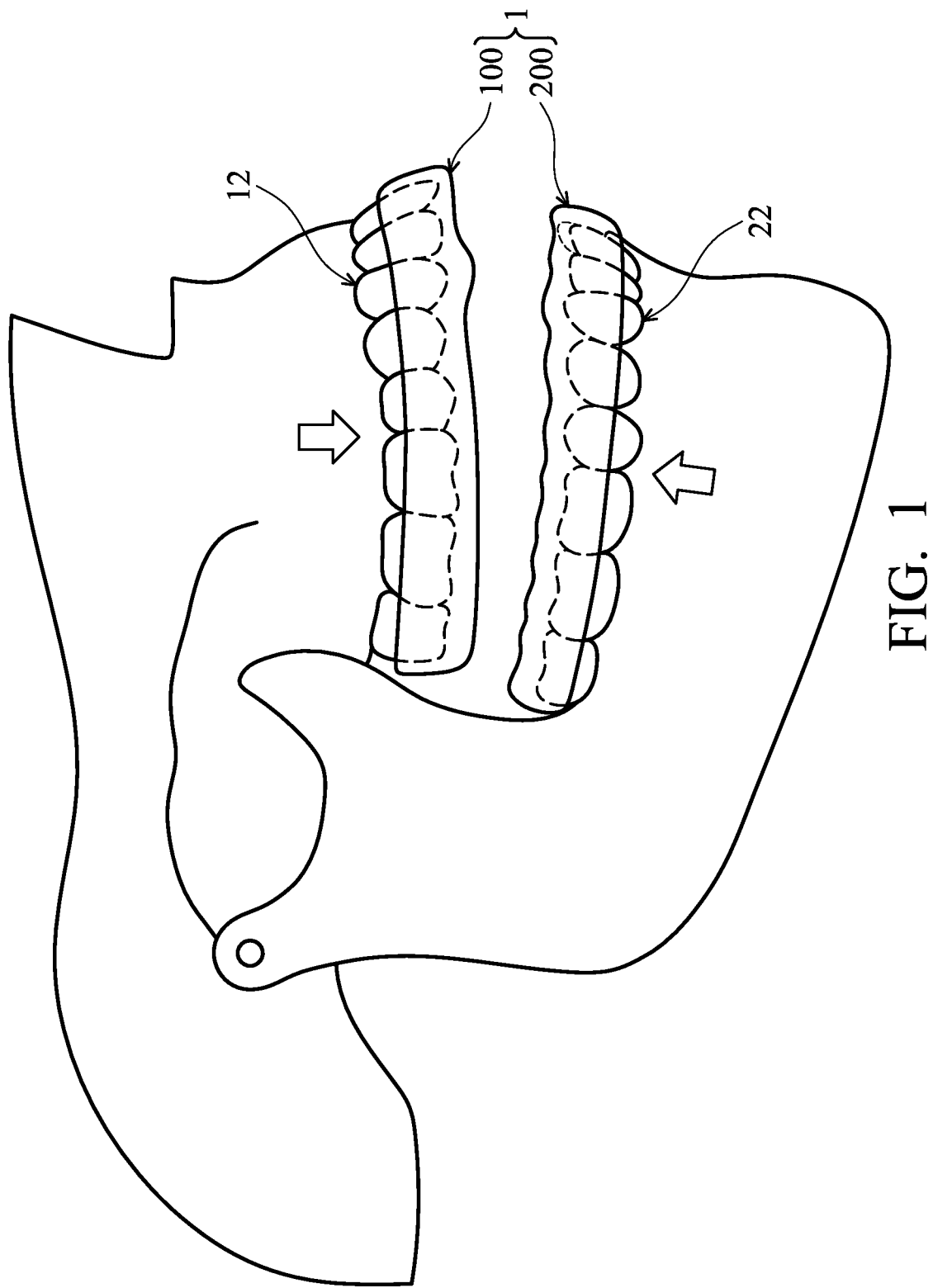
FIG. 1 is a schematic view illustrating a patient wearing a masticatory orthodontic correction device to masticate according to an embodiment of the invention.

In order to illustrate the purposes, features, and advantages of the invention, the preferred embodiments and drawings of the invention are shown in detail as follows.

In the following detailed description, the orientations of "on", "above", "under", "below", "left" and "right" are used for representing the relationship between the relative positions of each element as illustrated in the drawings, and are not meant to limit the invention.

Moreover, although the terms first, second, third, fourth etc. may be used in the following detailed description to describe various elements, regions or sections, these elements, regions or sections should not be limited by these terms. These terms are only used to distinguish one element, region or section from another element, region or section. Thus, a first element, region or section discussed below could be termed a second element, region or section without departing from the teachings of the present invention.

FIG. 1 is a schematic view of a patient wearing a masticatory orthodontic correction device 1 to masticate according to an embodiment of the invention. As shown in FIG. 1, the masticatory orthodontic correction device 1 includes a first correction unit 100 with a rigid body and a second correction unit 200 with a rigid body, wherein the first and second correction units 100 and 200 are removably worn on the maxillary dental arch 12 and the mandibular dental arch 22 of a patient, respectively. Being patient removable, the masticatory orthodontic correction device 1 is to be worn during mastication, occurring in daily activities such as eating food and chewing gum.

In particular, when a patient wears the masticatory orthodontic correction device 1 (the first and second correction units 100 and 200), loading on the teeth from the occlusion of the maxillary and mandibular dental arches 12 and 22 (as the arrows indicate in FIG. 1) during mastication is a driving force that enables the device 1 to function as an orthodontic correction device. The rigid bodies of the correction units 100 and 200 do not deform or apply resilient force against teeth, and their shapes are maintained without deformation when accommodating teeth even under loading from occlusal forces. This is in contrast with the case of clear aligners used in prior art, wherein the body or shell of the clear aligner is flexible and deforms when worn on teeth in malposition, using the resilient force of the aligner body or shell as the orthodontic correction force. The working principle of an embodiment of the present invention is described in the following paragraphs with reference to FIGS. 2A and 2B.

In some embodiments, the first and second correction units 100 and 200 may be occlusal splints made of orthodontic resin or other materials suitable for use in oral applications.

Figure 2A:
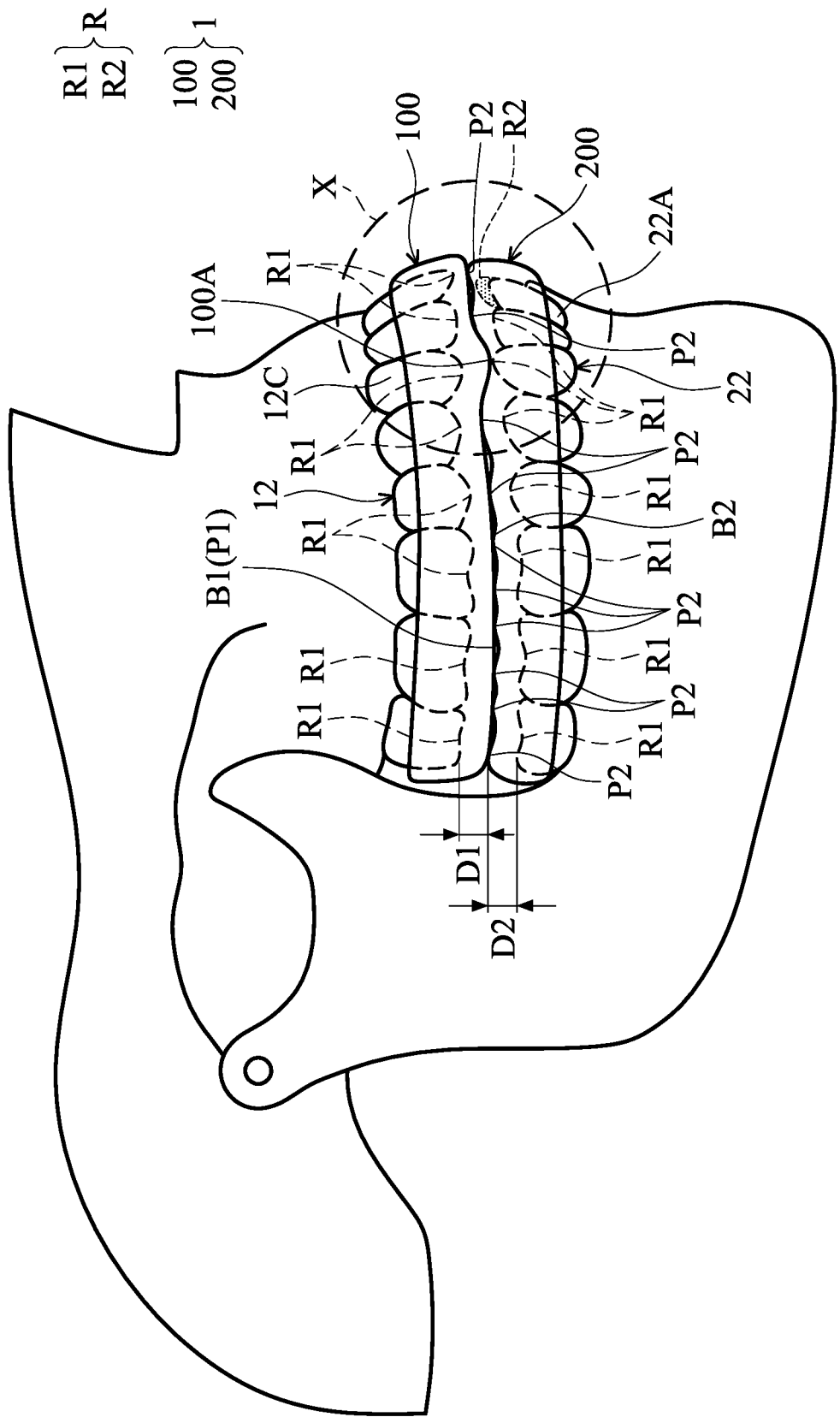
FIG. 2A is a schematic view illustrating the first and second correction units of the masticatory orthodontic correction device in FIG. 1 in occlusion.
Figure 2B:
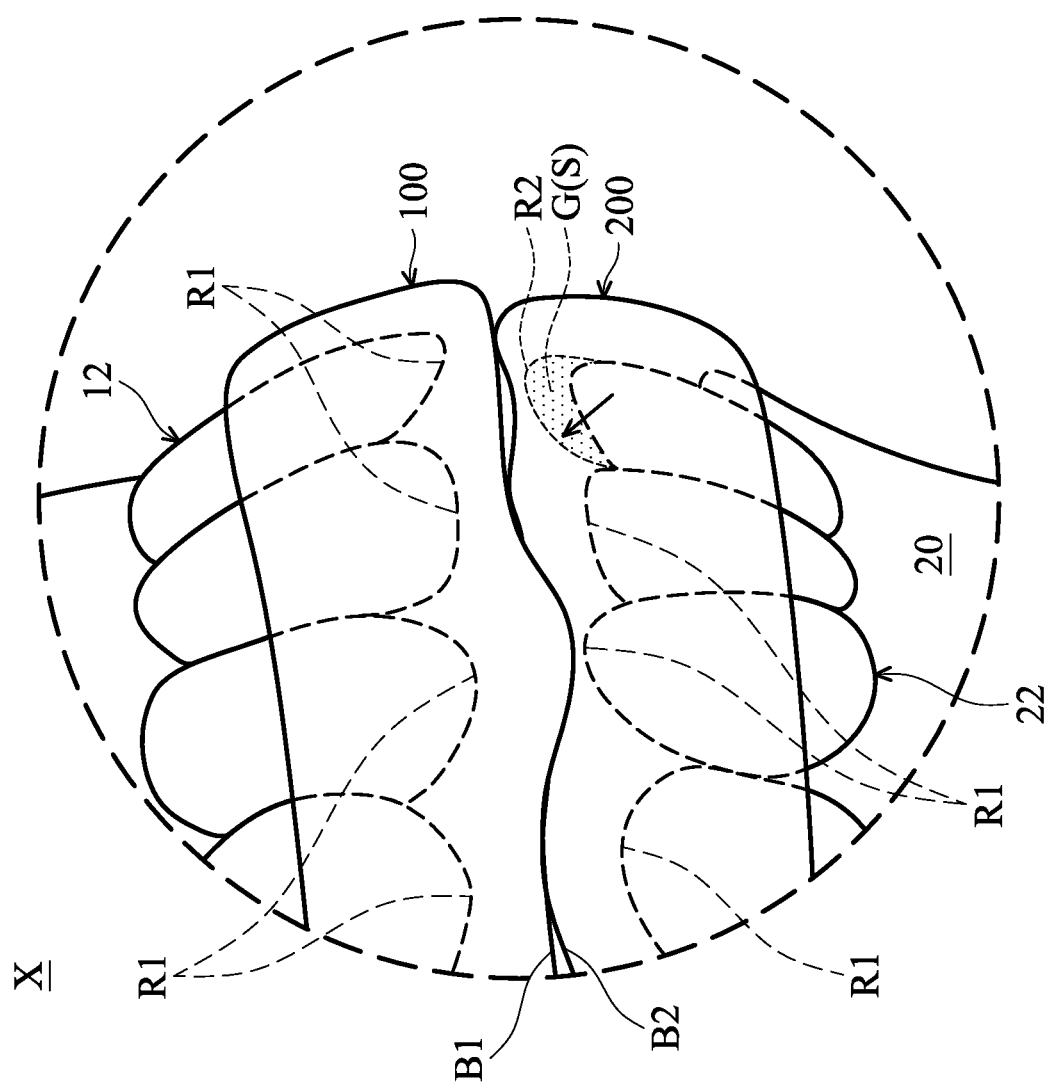
FIG. 2B is an enlarged view of part X in FIG. 2A.

FIG. 2A is a schematic view illustrating the first and second correction units 100 and 200 of the masticatory orthodontic correction device 1 in FIG. 1 in occlusion. FIG. 2B is an enlarged view of part X in FIG. 2A.

As shown in FIGS. 2A and 2B, a number of recesses R (indicated by dashed lines corresponding to both the maxillary and mandibular dental arches 12 and 22) are formed inside of the first and second correction units 100 and 200 for accommodating the teeth of the maxillary and mandibular dental arches 12 and 22. In this embodiment, the recesses R include a number of second recesses R1 and one first recess R2. The positions of the second recesses R1 correspond to the patient's teeth (second teeth) which don't require orthodontic movement. When the first and second correction units 100 and 200 are worn, the shapes of the second recesses R1 conform to the corresponding second teeth. The position of the first recess R2 corresponds to the patient's tooth (first tooth) in malposition which requires correction. The shape of the first recess R2 is determined by the shape of the first tooth in the envisioned corrected finish position. For example, as shown in FIGS. 2A and 2B, the patient has only one lower incisor 22A (first tooth) needing correction, and the corrected finish position of the lower incisor 22A is achieved by moving it slightly inward (as the arrow indicates in FIG. 2B). Accordingly, a first space G is formed between the first recess R2 and the lower incisor 22A for allowing the lower incisor 22A to move during mastication.

Furthermore, a buffering member S (FIG. 2B) is placed in the first space G between the first recess R2 and the lower incisor 22A. The buffering member S may be an elastic member made of a soft and non-hardening silicon-based material. In this embodiment, the buffering member S is fixed inside the first recess R2 by adhesion, for example. Preferably, the buffering member S covers the entire crown of the tooth in malposition (i.e. the lower incisor 22A in this embodiment).

Next, the working principle of the masticatory orthodontic correction device 1 is illustrated with reference to FIGS. 1A, 2A and 2B.

When the patient wears the first and second correction units 100 and 200 to masticate, loading from the occlusion of the maxillary and mandibular dental arches 12 and 22 during mastication is transferred from the correction unit 100 and 200 to the teeth and further to the periodontal ligament and the adjacent alveolar bone of each tooth.

Specifically, occlusal force is exerted on the second teeth during mastication. Occlusal loads are transmitted from the correction units 100 and 200 to each second tooth through the second recess R1 in direct contact with the second tooth. The correction units 100 and 200 hold and connect the second teeth, restricting tooth movement. Owing to the first space G (in which a buffering member S is fixed), the first tooth in malposition has some room for movement during mastication. Under loading from occlusion, the occlusal force is transmitted to the first tooth and its supporting tissue, buffered by the buffering member S. Also under occlusal loads, the shape of the first recess R2 induces a light guiding force on the first tooth though the buffering member S, wherein the first tooth in malposition and undergoing tooth movement is guided toward the envisioned finish position. When the first tooth in malposition moves in the first recess R2, the buffering member S deforms and covers the surface of the crown of the first tooth. The buffering member S buffers the exerted forces, which reduces the pain or discomfort felt by the patient during orthodontic correction.

It should be noted that the working principle of the masticatory orthodontic correction device 1 described above is clearly different from that of braces and clear aligners used in prior art. Orthodontic tooth movement is a process wherein mechanical force is applied to a tooth to cause bone remodeling. Tooth movement in the alveolar bone is actually the formation of new bone on the tension side of the periodontal ligament and bone resorption on the compression side. Light force is desirable because bone resorption occurs directly with less cell death, allowing a tooth to move through the alveolar bone more easily. Heavy and continuous force is undesirable because cell death in the periodontal ligament halts tooth movement and the long duration of the root surface of the tooth contacting the wall of the alveolar socket increases root resorption risks. With traditional braces, the orthodontic wire is fixed to brackets attached to the teeth, applying constant force on the teeth. In the case of clear aligners used in prior art, the body of the aligner is flexible and applies resilient force on the tooth in malposition, also in a constant way over 20 hours per day. In contrast, the rigid body of the correction unit of an embodiment of the present invention is not flexible and does not deform when the device is worn during mastication. The masticatory orthodontic correction device relies on intermittent short-duration occlusal forces generated during mastication for the applied orthodontic force, reducing the time and discomfort of wearing the device while accelerating orthodontic tooth movement.

The device 1 of the present invention is designed to be used during mastication when its orthodontic correction function is activated by occlusal loading. Therefore, for the device 1 to be functional, it requires features that establish functional occlusion during mastication. For an occlusion to be functional, the maxillary and mandibular teeth should contact in an efficient way without producing trauma for all movements of the jaw during mastication. In particular, functional occlusion requires that the positions of the condyles of the mandible be in the centric relation position, where the jaw can move comfortably for all masticatory movements. In the case of the present invention, occlusion takes place through the contact of the worn correction units or (in some other embodiments) the contact of one worn correction unit with the other dental arch without a correction unit, and the occlusal parts of the correction units should have features that establish functional occlusion.

Figure 3:
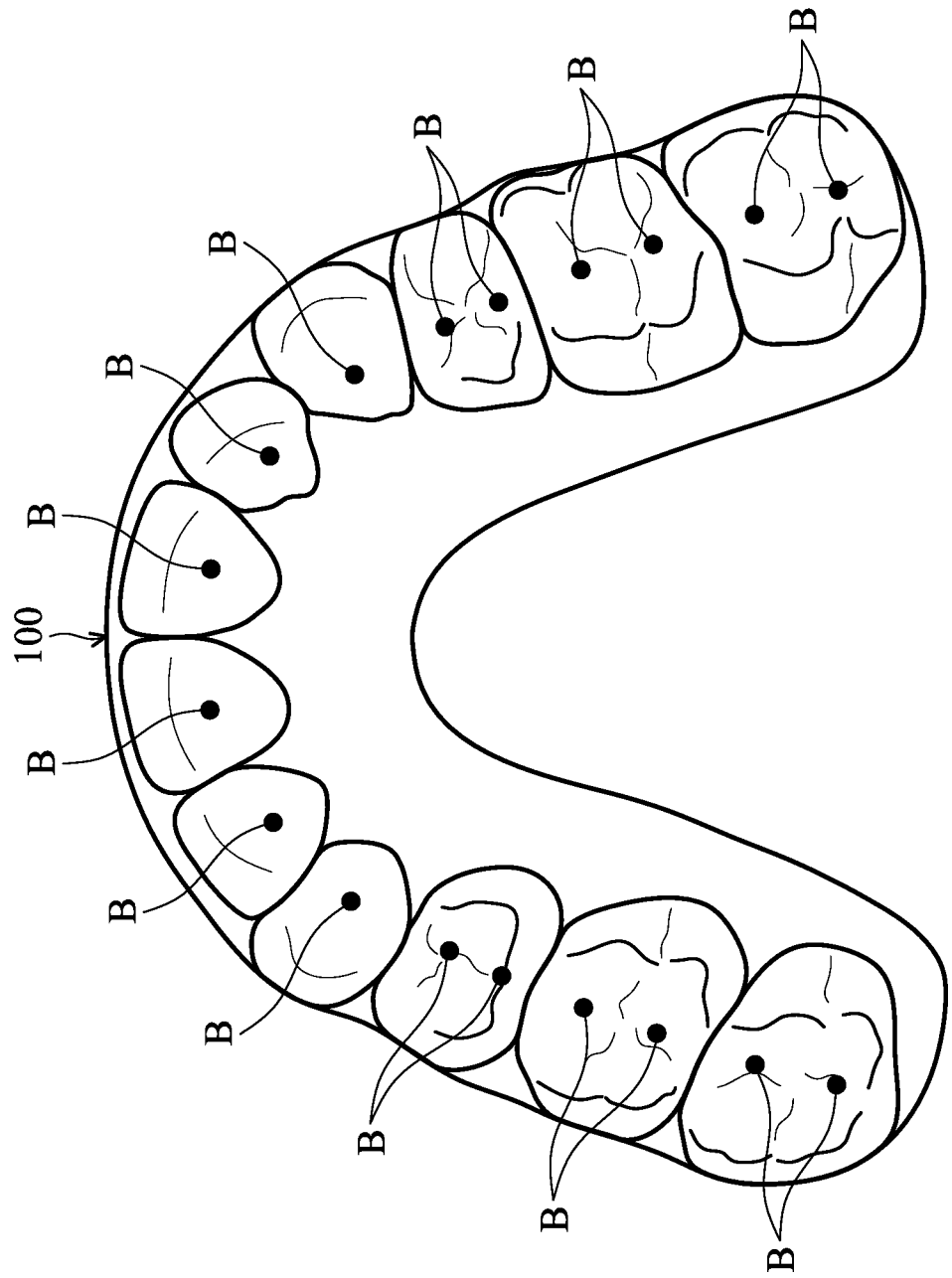
FIG. 3 is a schematic view illustrating the distribution of occlusal points on the first correction unit in FIG. 2A.

FIG. 3 is a schematic view illustrating the distribution of occlusal points on the first correction unit 100 in FIG. 2A. Referring to FIGS. 2A and 3, the first correction unit 100 has a first occlusal part B1, and the second correction unit 200 has a second occlusal part B2 corresponding to the first occlusal part B1. The shapes of the occlusal parts B1 and B2 have features that establish functional occlusion for the worn correction units 100 and 200. Specifically, the first occlusal part B1 forms a plane P1 thereon, and the second occlusal part B2 forms several protrusions P2 thereon for contacting the plane P1. When the first and second correction units 100 and 200 are in occlusion (i.e. the first occlusal part B1 contacts the second occlusal part B2), the occlusal points B (i.e. the contact points formed by the plane P1 and the protrusions P2) on the first correction unit 100 are distributed in a curve (FIG. 3), and the positions of the occlusal points B respectively correspond to the gullet centers of each tooth of the maxillary dental arch 12.

The manner of occlusion is defined by the way the first and second correction units 100 and 200 make contact. In this case, when the patient wears the first and second correction units 100 and 200 to masticate, the plane P1 contacts the protrusions P2 simultaneously (when the first occlusal part B1 contacts the second occlusal part B2) or separates from the protrusions P2 simultaneously (when the first occlusal part B1 separates from the second occlusal part B2). Furthermore, occlusion occurs with the maximum effective contact area without slipping or other damaging movements, and pressure is more evenly distributed. Consequently, the effectiveness of correction and comfort of the patient wearing the first and second correction units 100 and 200 are improved.

Figure 4:
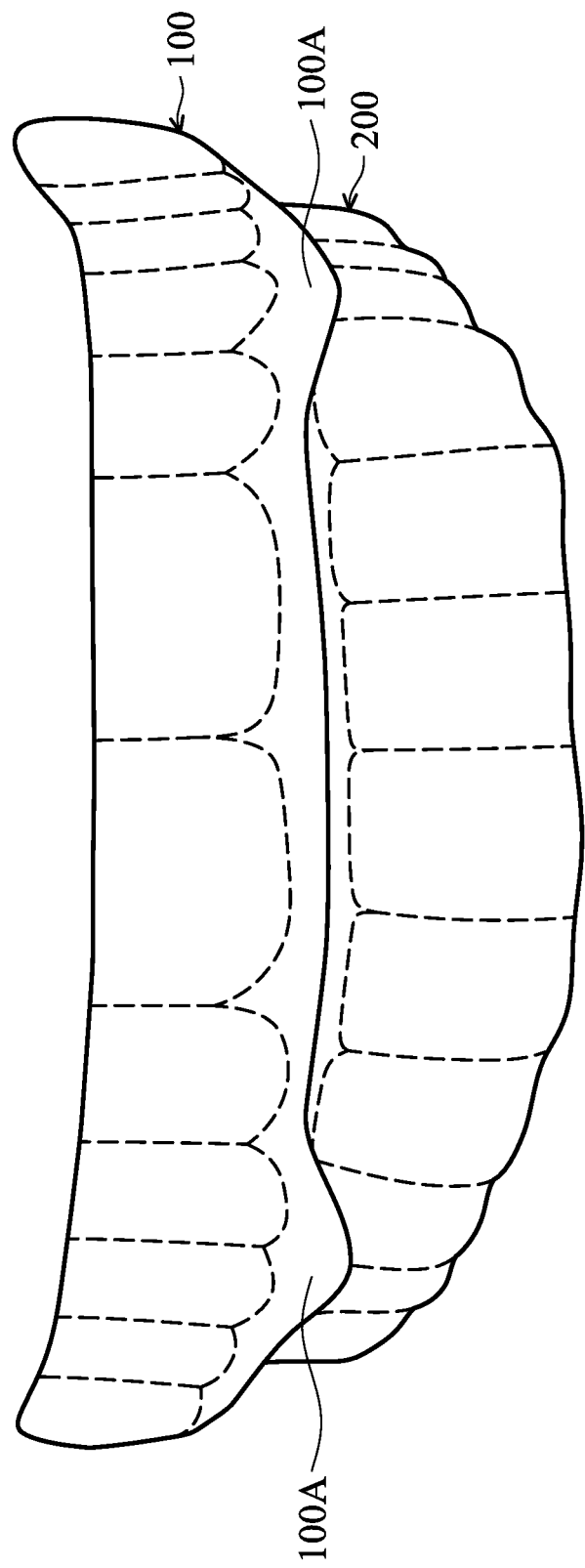
FIG. 4 is a schematic view of the first and second correction units from another viewing angle.

FIG. 4 is a schematic view of the first and second correction units 100 and 200 in FIG. 2A from another viewing angle. Referring to FIGS. 2A and 4, the first correction unit 100 of this embodiment further has several limit parts 100A (e.g. two limit parts 100A) formed on the left and right buccal parts thereof. The limit parts 100A each form a guiding surface on the lingual side thereof (not shown) for guiding the second correction unit 200. Thus, the limit parts 100A can limit the movement range of the second correction unit 200 relative to the first correction unit 100 in the horizontal direction (when the first and second correction units 100 and 200 are in occlusion). Although the limit part 100A is arranged corresponding to the upper canine 12C as shown in FIGS. 2A and 4, it may also be arranged corresponding to another tooth of the maxillary dental arch 12 (e.g. the premolar).

Referring to FIG. 2A, in some embodiments, the sum of the thickness D1 of the first occlusal part B1 of the first correction unit 100 and the thickness D2 of the second occlusal part B2 of the second correction unit 200 (i.e. D1+D2) is between 1.5 mm and 2.5 mm.

It should also be noted that the patient can wear the masticatory orthodontic correction device 1 to masticate for short durations (e.g. about a half hour for each meal), and achieve sufficient orthodontic tooth movement. In contrast, conventional braces are worn all the time, and clear aligners used in prior art are to be worn for more than 20 hours per day.

Although only a single lower incisor 22A (FIG. 2A) is illustrated as an example of a first tooth requiring correction in the aforesaid embodiments, the number of first teeth in malposition requiring correction is not limited to one.

Although the masticatory orthodontic correction device described above includes two correction units (a first correction unit 100 and a second correction unit 200), it may also include a single correction unit placed on the maxillary or mandibular dental arch. For example, when the patient's teeth in malposition are maxillary teeth, he can wear a single correction unit on his maxillary dental arch. Conversely, the patient can wear a single correction unit on his mandibular dental arch.

In some embodiments, when the patient wears a single correction unit, the occlusal part of the correction unit may also form a plane thereon. Also, the plane can simultaneously contact or separate from the cusps (on the occlusal part) of the teeth of the other dental arch which is without a correction unit. Moreover, the occlusal points (i.e. the contact points formed by the plane on the occlusal part of the correction unit and the cusps on the occlusal part of the teeth of the other dental arch) are also distributed in a curve, and the positions of the occlusal points respectively correspond to the gullet centers of each tooth of the dental arch with a correction unit. Furthermore, the correction unit may also include several limit parts (e.g. two limit parts) formed on the left and right buccal sides thereon, wherein the limit parts each form a guiding surface thereon for guiding the teeth of the other dental arch without a correction unit. Accordingly, the limit parts can limit the movement range of the dental arch without a correction unit relative to the dental arch with a correction unit in the horizontal direction when the two are in occlusion.

The first and second correction units 100 and 200 with rigid bodies may be occlusal splints. The occlusal splint may be transparent, translucent, non-transparent, colored, patterned, with or without openings, but not limited to these appearances.

Figure 5:
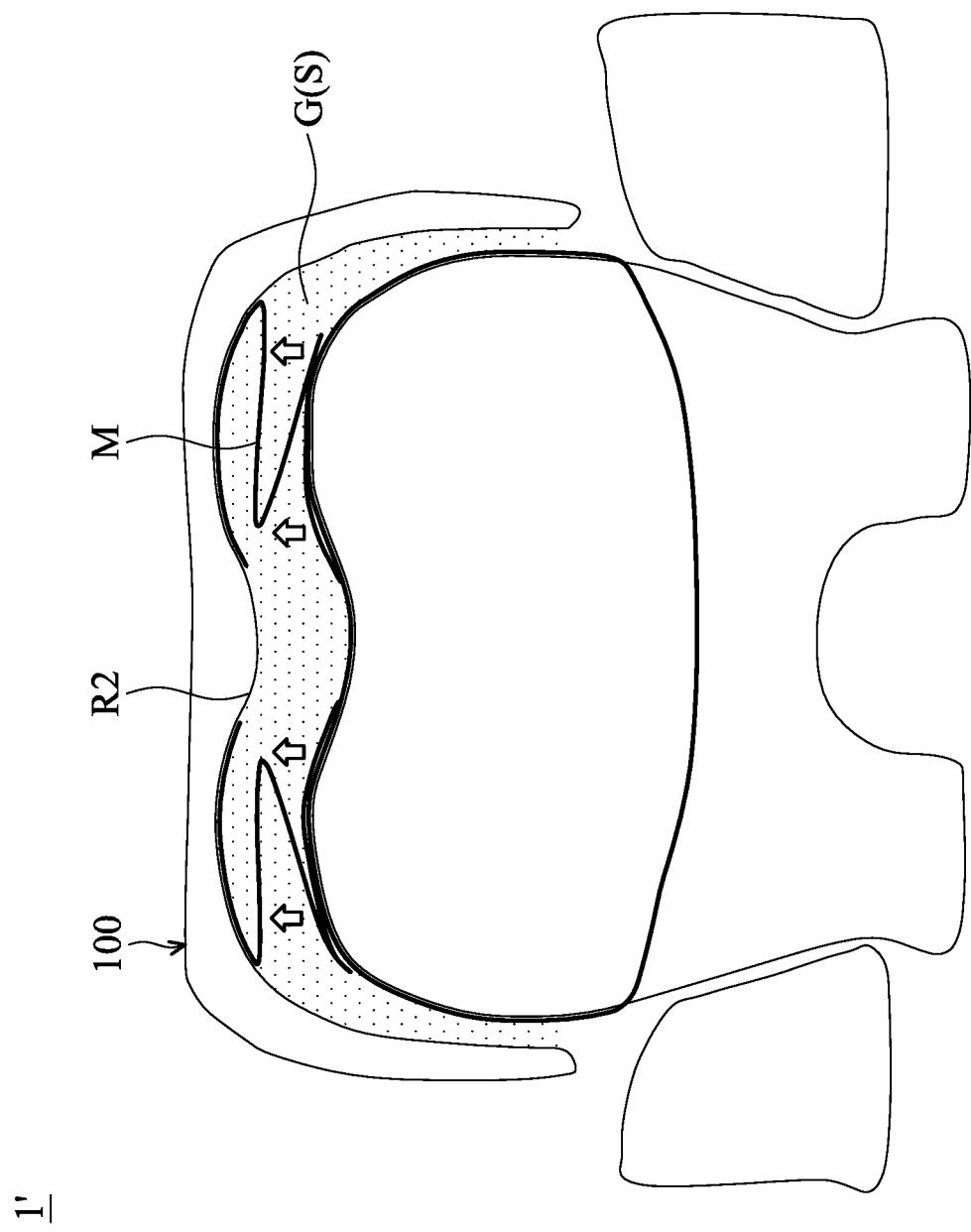
FIG. 5 is a schematic view illustrating the structure of a shape-memory member in a first recess according to another embodiment of the invention.

FIG. 5 is a schematic view illustrating the structure of a shape-memory member in a first recess R2 according to another embodiment of the invention. As shown in FIG. 5, this embodiment provides a masticatory orthodontic correction device 1' including at least one correction unit 100 worn on the maxillary or mandibular dental arch of a patient, a first recess R2 formed in the correction unit 100, corresponding to the patient's tooth (first tooth) in malposition which requires correction, and having a first space G which allows the first tooth to move therein during mastication, an buffering member S (indicated by the dotted area) formed in the first space G between the first recess R2 and the first tooth, and a shape-memory member M formed in the first recess R2. The shape-memory member M may be constructed as a mesh, for example.

In this embodiment, when the correction unit 100 is worn during mastication, the shape-memory member M conforms to the first tooth with the shape-memory member M in a deformed state and gradually applies stress on the first tooth as the shape-memory member M gradually returns to its remembered shape. More specifically, the shape-memory member M is anchored on the correction unit 100. The remembered shape of the shape-memory member M conforms to the shape of the first tooth, but in its finish position. Under room temperature, the shape-memory member M is in the deformed state. When first worn on the first tooth, the shape-memory member M is deformable, and can stretch to fit over the first tooth. As the temperature rises, the shape-memory member M gradually returns to its remembered shape, which causes the first tooth to be stressed and guided to its finish position (as the arrows indicate in FIG. 5).

A method of using the above devices to perform orthodontic correction is also provided in some embodiments of the invention, including: having the patient wear the first and second correction units or one correction unit on just one of the dental arches, and having the patient masticate for 15 to 20 minutes. Mastication can take place during meals, occurring three times a day, for a total of one hour of wear time. Occlusal loads generated during mastication provide the driving force enabling the devices to function as orthodontic correction devices.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A masticatory orthodontic correction device adapted to use occlusal loads generated during mastication as a correction force to achieve orthodontic correction for a patient having a first tooth of the maxillary or mandibular dental arch in malposition, the masticatory orthodontic correction device comprising:
- a correction unit with a rigid body configured to be removably worn on one of the maxillary or mandibular dental arch of the patient during mastication, wherein when worn, a shape of the correction unit is maintained without deformation when accommodating teeth, and the correction unit has an occlusal part which is exposed and faces the other dental arch without a correction unit;
- a first recess formed in the correction unit and corresponding to the first tooth, wherein a shape of the first recess leaves a first space between the first recess and the first tooth when the masticatory orthodontic correction device is worn by the patient, arranged such that the first tooth can move in the first recess when the correction unit is worn during mastication;
- a buffering member disposed in the first space and configured to transmit and buffer the occlusal loads generated during mastication between the first recess and the first tooth, wherein the buffering member is deformable and arranged such that when the correction unit is worn during mastication, the buffering member deforms and contacts the first tooth over an area, wherein the buffering member is made of an elastic material; and
- a plurality of second recesses formed in the correction unit, wherein the plurality of second recesses correspond to a plurality of second teeth of the maxillary or mandibular dental arch of the patient not requiring orthodontic correction, wherein shapes of the second recesses respectively conform to the second teeth with no buffering member disposed between each of the second recesses and the respective second tooth, arranged such that a part of the occlusal loads are transferred from the correction unit to the second teeth during mastication while the masticatory orthodontic correction device is worn by the patient,
- wherein the occlusal part has a shape configured to establish functional occlusion with the other dental arch without a correction unit, and the correction unit further has a left buccal part, a right buccal part, and a plurality of limit parts formed on the left and right buccal parts, wherein the limit parts each have a lingual guiding surface arranged to contact buccal surfaces of the other dental arch and configured to limit a movement range of the other dental arch relative to the correction unit in a lateral direction during mastication.

2. The masticatory orthodontic correction device as claimed in claim 1, wherein the shape of the first recess further guides the movement of the first tooth in the first recess when the correction unit is worn during mastication.

3. The masticatory orthodontic correction device as claimed in claim 1, wherein the correction unit further has a shape-memory member formed in the first recess, and when the correction unit is worn during mastication, the shape-memory member conforms to the first tooth with the shape-memory member in a deformed state and gradually applies stress on the first tooth as the shape-memory member gradually returns to its remembered shape.

4. The masticatory orthodontic correction device as claimed in claim 1, wherein the correction unit is an occlusal splint.

5. An orthodontic correction method, comprising:
- using the masticatory orthodontic correction device as claimed in claim 1 by coupling the first correction unit to a maxillary dental arch of a patient and by coupling the second correction unit to a mandibular dental arch of the patient; and
- having the patient masticate for at least 15 minutes so that the transmitted occlusal loads generated during mastication provides the correction force that causes tooth movement.

6. The masticatory orthodontic correction device as claimed in claim 1, wherein the buffering member at least covers an occlusal surface of the first tooth.

7. The masticatory orthodontic correction device as claimed in claim 1, wherein the first recess does not apply a resilient force against the first tooth when the correction unit is worn.

8. The masticatory orthodontic correction device as claimed in claim 1, wherein each of the second recesses directly contact the respective second tooth.

9. The masticatory orthodontic correction device as claimed in claim 1, wherein the occlusal part comprises a plurality of protrusions, arranged such that when the correction unit is worn, the protrusions extend toward the other dental arch without a correction unit.

10. The masticatory orthodontic correction device as claimed in claim 9, wherein the protrusions are arranged such that when the correction unit is worn, the protrusions extend respectively toward gullet centers of teeth in the other dental arch without a correction unit.

11. A masticatory orthodontic correction device adapted to use occlusal loads generated during mastication as a correction force to achieve orthodontic correction for a patient having a first tooth of the maxillary or mandibular dental arch in malposition, the masticatory orthodontic correction device comprising:
- a first correction unit with a rigid body configured to be removably worn on the maxillary dental arch of the patient during mastication, wherein when worn, a shape of the first correction unit is maintained without deformation when accommodating teeth, and the first correction unit has a first occlusal part;
- a second correction unit with a rigid body configured to be removably worn on the mandibular dental arch of the patient during mastication, wherein when worn, a shape of the second correction unit is maintained without deformation when accommodating teeth, and the second correction unit has a second occlusal part corresponding to the first occlusal part, wherein the first and second occlusal parts are exposed and face each other;
- a first recess formed in the first or second correction unit and corresponding to the first tooth, wherein a shape of the first recess leaves a first space between the first recess and the first tooth when the masticatory orthodontic correction device is worn by the patient, arranged such that the first tooth can move in the first recess when the first and second correction units are worn during mastication;

a buffering member disposed in the first space and configured to transmit and buffer the occlusal loads generated during mastication between the first recess and the first tooth, wherein the buffering member is deformable and arranged such that when the first and second correction units are worn during mastication, the buffering member deforms and contacts the first tooth over an area, wherein the buffering member is made of an elastic material; and a plurality of second recesses formed in the first and second correction units, the plurality of second recesses correspond to a plurality of second teeth of the maxillary and mandibular dental arches of the patient not requiring orthodontic correction, wherein shapes of the second recesses respectively conform to the second teeth with no buffering member disposed between each of the second recesses and the respective second tooth, arranged such that a part of the occlusal loads are transferred from the first and second correction unit to the second teeth during mastication while the masticatory orthodontic correction device is worn by the patient, wherein the first and second occlusal parts have shapes configured to establish functional occlusion, and the first correction unit has a left buccal part, a right buccal part, and a plurality of limit parts formed on the left and right buccal parts, and the second correction unit has a left buccal surface and a right buccal surface, wherein the limit parts each have a lingual guiding surface arranged to contact the left or right buccal surfaces and configured to limit a movement range of the second correction unit relative to the first correction unit in a lateral direction during mastication.

12. The masticatory orthodontic correction device as claimed in claim 11, wherein the shape of the first recess further guides the movement of the first tooth in the first recess when the first and second correction units are worn during mastication.

13. The masticatory orthodontic correction device as claimed in claim 11, wherein the first and second correction units are occlusal splints.

14. The masticatory orthodontic correction device as claimed in claim 11, wherein the first and second correction units further have at least one shape-memory member formed in the first recess, and when the first and second correction units are worn during mastication, the shape-memory member conforms to the first tooth with the shape-memory member in a deformed state and gradually applies stress on the first tooth as the shape-memory member gradually returns to its remembered shape.

15. The masticatory orthodontic correction device as claimed in claim 11, wherein the first occlusal part forms a plane thereon, and the second occlusal part forms a plurality of protrusions thereon for contacting the plane.

16. The masticatory orthodontic correction device as claimed in claim 15, wherein when the first occlusal part contacts the second occlusal part, the plane contacts the protrusions simultaneously, and when the first occlusal part separates from the second occlusal part, the plane separates from the protrusions simultaneously.

17. The masticatory orthodontic correction device as claimed in claim 15, wherein when the first occlusal part contacts the second occlusal part, the plane and the protrusions form a plurality of contact points, wherein the contact points are distributed in a curved line, and positions of the contact points respectively correspond to gullet centers of each tooth of the maxillary dental arch.

18. The masticatory orthodontic correction device as claimed in claim 15, wherein a sum of thicknesses of the first and second occlusal parts is between 1.5 mm and 2.5 mm.

19. An orthodontic correction method, comprising:

using the masticatory orthodontic correction device as claimed in claim 11 by coupling the correction unit to a maxillary or mandibular dental arch of a patient; and having the patient masticate for at least 15 minutes so that the transmitted occlusal loads generated during mastication provides the correction force that causes tooth movement.

20. The masticatory orthodontic correction device as claimed in claim 11, wherein the occlusal part comprises a plurality of protrusions, arranged such that when the correction unit is worn, the protrusions extend toward the other dental arch without a correction unit.

21. The masticatory orthodontic correction device as claimed in claim 20, wherein the contact points correspond to gullet centers of first and/or second teeth received in the first correction unit.

* * * * *